US009478181B2

(12) United States Patent
Cho et al.

(10) Patent No.: US 9,478,181 B2
(45) Date of Patent: Oct. 25, 2016

(54) DISPLAY APPARATUS

(71) Applicant: Samsung Display Co., LTD., Yongin, Gyeonggi-Do (KR)

(72) Inventors: Dong-Beom Cho, Asan-si (KR); Young-Dong Koo, Yongin-si (KR); Min-Wook Park, Asan-si (KR)

(73) Assignee: SAMSUNG DISPLAY CO., LTD. (KR)

(*) Notice: Subject to any disclaimer, the term of this patent is extended or adjusted under 35 U.S.C. 154(b) by 205 days.

(21) Appl. No.: 14/151,070

(22) Filed: Jan. 9, 2014

(65) Prior Publication Data

US 2015/0015553 A1 Jan. 15, 2015

(30) Foreign Application Priority Data

Jul. 15, 2013 (KR) ........................ 10-2013-0082830

(51) Int. Cl.

*G06F 3/038* (2013.01)
*G09G 5/00* (2006.01)
*G09G 3/36* (2006.01)
*G09G 3/00* (2006.01)

(52) U.S. Cl.

CPC ............ *G09G 3/3611* (2013.01); *G09G 3/003* (2013.01); *G09G 2300/0426* (2013.01); *G09G 2320/0223* (2013.01)

(58) Field of Classification Search

CPC ............... G09G 3/3611; G09G 3/003; G09G 2300/0426; G09G 2320/0223
See application file for complete search history.

(56) References Cited

U.S. PATENT DOCUMENTS

| | | | | |
|---|---|---|---|---|
| 6,683,669 | B1 * | 1/2004 | Fujikawa | G02F 1/1345 349/149 |
| 7,088,323 | B2 | 8/2006 | Yeo et al. | |
| 7,787,095 | B2 | 8/2010 | Lim | |
| 2002/0080317 | A1 * | 6/2002 | Yeo | G02F 1/13452 349/149 |
| 2008/0137016 | A1 | 6/2008 | Kim et al. | |
| 2012/0081410 | A1 * | 4/2012 | Yeo | G09G 3/2092 345/690 |

FOREIGN PATENT DOCUMENTS

| | | | |
|---|---|---|---|
| KR | 1020040087452 | A | 10/2004 |
| KR | 1020050001882 | A | 1/2005 |
| KR | 1020050073660 | A | 7/2005 |
| KR | 1020060020174 | A | 3/2006 |
| KR | 1020080077826 | A | 8/2008 |

* cited by examiner

*Primary Examiner* — Andrew Sasinowski
*Assistant Examiner* — Brent D Castiaux
(74) *Attorney, Agent, or Firm* — Cantor Colburn LLP

(57) ABSTRACT

A display apparatus includes a display panel including a display area in which gate lines and data lines are disposed to display an image and a peripheral area which is disposed around the display area and includes fan-out lines having different lengths, and a driving part configured to output driving signals having different levels to channels respectively connected to the fan-out lines according to the different lengths of the fan-out lines.

12 Claims, 7 Drawing Sheets

DISPLAY APPARATUS

This application claims priority to Korean Patent Application No. 10-2013-0082830, filed on Jul. 15, 2013, and all the benefits accruing therefrom under 35 U.S.C. §119, the contents of which are herein incorporated by reference in their entireties.

BACKGROUND

1. Field

Exemplary embodiments of the invention relate to a display apparatus. More particularly, exemplary embodiments of the invention relate to a display apparatus including a driving part having tape carrier package type.

2. Description of the Related Art

A display apparatus such as a liquid crystal display ("LCD") apparatus typically includes a display panel, a gate driving part and a data driving part.

The display panel includes a gate line extending in a first direction and a data line extending in a second direction substantially perpendicular to the first direction. The gate driving part outputs a gate signal to the gate line. The data driving part outputs a data signal to the data line.

The data driving part may include a data driving film bonded to a first peripheral area of the display panel and a data driving integrated circuit ("IC") disposed on the data driving film. Thus, the data driving part may have tape carrier package ("TCP") type. In addition, the gate driving part may include a gate driving film bonded to a second peripheral area of the display panel and a gate driving IC disposed on the gate driving film. Thus, the gate driving part may have TCP type.

When the data driving part has the TCP type, the data driving film on which the data driving IC is disposed is connected to the data lines through data fan-out lines disposed on the display panel, and thus lengths of the data fan-out lines between the data driving film and the data lines are different.

In addition, when the gate driving part has the TCP type, the gate driving film on which the gate driving IC is disposed is connected to the gate lines through gate fan-out lines disposed on the display panel, and thus lengths of the gate fan-out lines between the gate driving film and the gate lines are different.

SUMMARY

When lengths of data fan-out lines are different, line resistances of the data fan-out lines are different, and when lengths of gate fan-out lines are different, line resistances of the gate fan-out lines are different. Thus, display quality of a display panel is deteriorated.

In addition, when the data fan-out lines has a curved or bent portion in order to equalize the lengths of the data fan-out lines, the first peripheral area of the display panel in which the data fan-out lines are disposed becomes wider, and when the gate fan-out lines has a curve or bent portion in order to equalize the lengths of the gate fan-out lines, the second peripheral area of the display panel in which the gate fan-out lines are disposed is wider. Thus, a bezel of the display apparatus is increased.

Exemplary embodiments of the invention provide a display apparatus capable of improving display quality and decreasing a width of a bezel.

According to an exemplary embodiment of the invention, a display apparatus includes a display panel and a driving part. The display panel includes a display area in which gate lines and data lines are disposed to display an image and a peripheral area disposed around the display area and including fan-out lines having different lengths. The driving part is configured to output driving signals having different levels to channels connected to the fan-out lines according to the lengths of the fan-out lines.

In one exemplary embodiment, the level of the driving signal may be increased as the length of the fan-out line is increased.

In one exemplary embodiment, the driving part may be a data driving part outputting data signals to the data lines, and the fan-out lines may be data fan-out lines electrically connected to the data lines.

In one exemplary embodiment, a level of the data signal outputted to the data fan-out line may be increased as a length of the data fan-out line is increased.

In one exemplary embodiment, the data driving part may include a data driving film attached to the peripheral area of the display panel, and a data driving integrated circuit ("IC") disposed on the data driving film and outputting the data signals.

In one exemplary embodiment, the data driving part may further include data film lines disposed on the data driving film and electrically connecting the data driving film with the data fan-out lines, and lengths of the data film lines may be different.

In one exemplary embodiment, a level of the data signal outputted to the data film line and the data fan-out line may be increased as a length of the data film line and a length of the data fan-out line are increased.

In one exemplary embodiment, the driving part may be a gate driving part outputting gate signals to the gate lines, and the fan-out lines may be gate fan-out lines electrically connected to the gate lines.

In one exemplary embodiment, a level of the gate signal outputted to the gate fan-out line may be increased as a length of the gate fan-out line is increased.

In one exemplary embodiment, the gate driving part may include a gate driving film attached to the peripheral area of the display panel, and a gate driving IC disposed on the gate driving film and outputting the gate signals.

In one exemplary embodiment, the gate driving part may further include gate film lines disposed on the gate driving film and electrically connecting the gate driving film with the gate fan-out lines, and lengths of the gate film lines may be different.

In one exemplary embodiment, a level of the gate signal outputted to the gate film line and the gate fan-out line may be increased as a length of the gate film line and a length of the gate fan-out line are increased.

According to another exemplary embodiment of the invention, a display apparatus includes a display panel and a driving part. The display panel includes a display area in which gate lines and data lines are deposed to display an image and a peripheral area disposed around the display area and including fan-out lines having different lengths. The driving part includes film lines electrically connected to the fan-out lines, respectively, and having different lengths according to the lengths of the fan-out lines and a driving IC configured to output driving signals through channels electrically connected to the film lines, respectively.

In one exemplary embodiment, the driving part may be a data driving part outputting data signals to the data lines, the fan-out lines may be data fan-out lines electrically connected to the data lines, respectively, and the film lines may be data film lines electrically connected to the data fan-out lines, respectively.

In one exemplary embodiment, lengths of the data film lines and the data fan-out lines electrically connected with each other may be the same as each other.

In one exemplary embodiment, the data driving part may include a data driving film attached to the peripheral area of the display panel and a data driving IC disposed on the data driving film and outputting the data signals.

In one exemplary embodiment, the driving part may be a gate driving part outputting gate signals to the gate lines, respectively, the fan-out lines may be gate fan-out lines electrically connected to the gate lines, respectively, and the film lines may be gate film lines electrically connected to the gate fan-out lines, respectively.

In one exemplary embodiment, lengths of the gate film lines and the gate fan-out lines electrically connected with each other may be the same as each other.

In one exemplary embodiment, the gate driving part may include a gate driving film attached to the peripheral area of the display panel, and a gate driving IC disposed on the gate driving film and outputting the gate signals.

According to another exemplary embodiment of the invention, a display apparatus includes a display panel and a driving part. The display panel includes a display area in which gate lines and data lines are disposed to display an image and a peripheral area disposed around the display area and including fan-out lines electrically connected to the gate lines or the data lines, respectively. The driving part includes film lines electrically connected to the fan-out lines, respectively, and having different lengths and a driving IC outputting driving signals having different levels to channels connected to the film lines, respectively.

According to the invention, different resistances of data fan-out lines and different resistances of gate fan-out lines may be compensated, and thus display quality of the display apparatus may be improved.

In addition, a width of a peripheral area in a display panel in which a data driving part and a gate driving part is decreased, and thus a width of a bezel of the display apparatus may be decreased.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
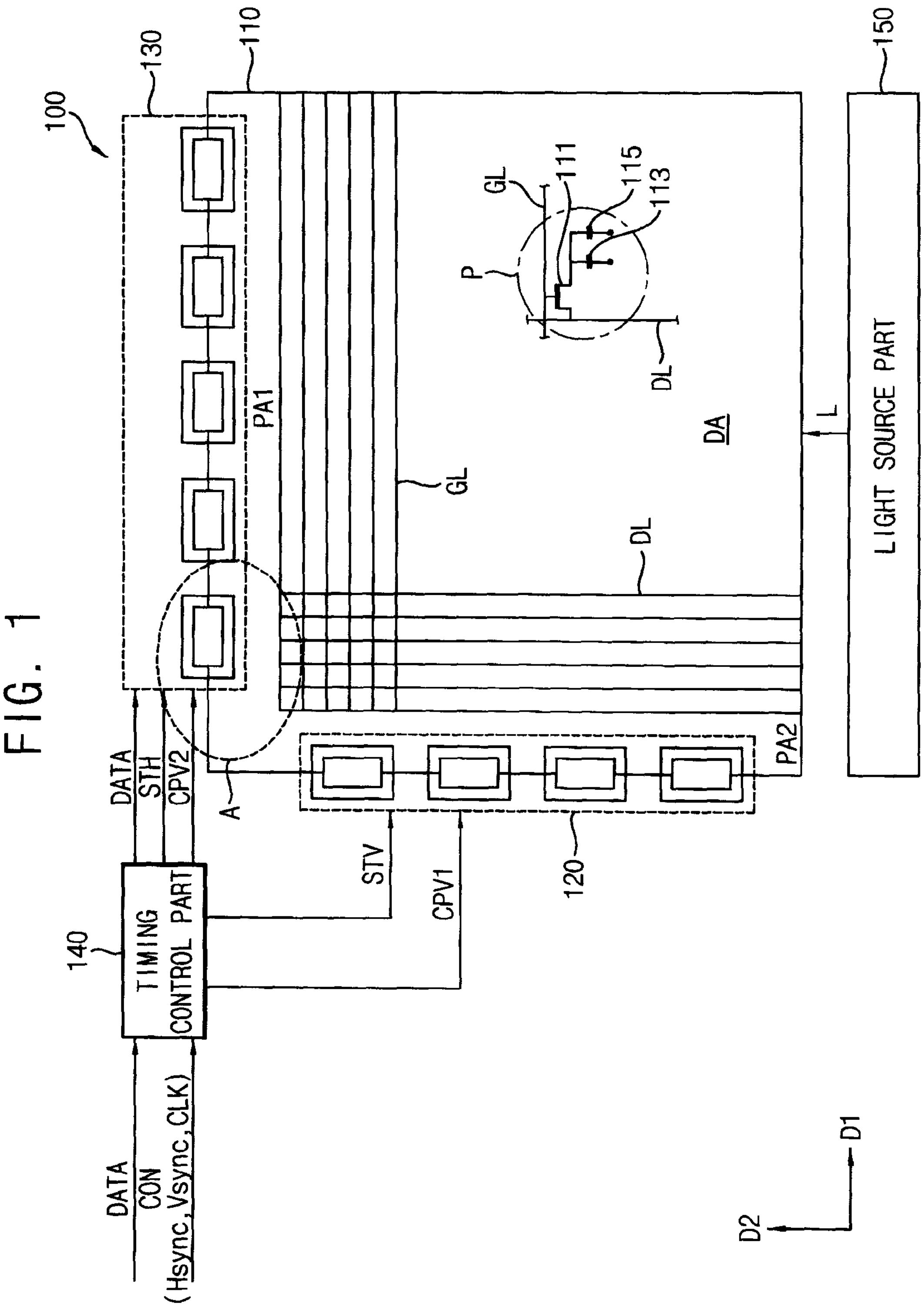
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a block diagram illustrating a display apparatus according to an exemplary embodiment of the invention.

Referring to FIG. 1, the display apparatus 100 according to the illustrated exemplary embodiment includes a display panel 110, a gate driving part 120, a data driving part 130 and a timing control part 140.

The display panel 110 receives a data signal based on an image data DATA to display an image. In an exemplary embodiment, the image data DATA may be two-dimensional ("2D") plane image data, for example. Alternatively, in another exemplary embodiment, the image data DATA may include a left-eye image data and a right-eye image data for displaying a three-dimensional ("3D") stereoscopic image, for example.

The display panel 110 includes a display area DA displaying the image, a first peripheral area PA1 disposed around the display area DA and adjacent to the data driving part 130 and a second peripheral area PA2 disposed around the display area DA and adjacent to the gate driving part 120. In the exemplary embodiment illustrated in FIG. 1, the gate driving part 120 is disposed on one side (e.g., left side) of the display panel 110. However, the invention is not limited thereto and the gate driving part 120 may be disposed on opposing sides (e.g., left and right sides) of the display panel 110.

The display area DA of the display panel 110 includes gate lines GL, data lines DL and a plurality of pixels P. The gate line GL extends in a first direction D1 and the data line DL extends in a second direction D2 substantially perpendicular to the first direction D1. The first direction D1 may be substantially parallel with a long side of the display panel 110 and the second direction D2 may be substantially parallel with a short side of the display panel 110. Each of the plurality of pixels P includes a thin-film transistor ("TFT") 111 electrically connected to the gate line GL and the data line DL, and a liquid crystal capacitor 113 and a storage capacitor 115 connected to the TFT 111.

The gate driving part 120 generates a gate signal in response to a gate start signal STV and a gate clock signal CPV1 provided from the timing control part 140, and outputs the gate signal to the gate line GL. The gate driving part 120 may be disposed on the second peripheral area PA2 of the display panel 110.

The data driving part 130 outputs the data signal based on the image data DATA to the data line DL, in response to a data start signal STH and a data clock signal CPV2 provided from the timing control part 140. The data driving part 130 may be disposed on the first peripheral area PA1 of the display panel 110.

The timing control part 140 receives the image data DATA and a control signal CON from an outside. The control signal CON may include a horizontal synchronous signal Hsync, a vertical synchronous signal Vsync and a clock signal CLK. The timing control part 140 generates the data start signal STH using the horizontal synchronous signal Hsync and outputs the data start signal STH to the data driving part 130. In addition, the timing control part 140 generates the gate start signal STV using the vertical synchronous signal Vsync and outputs the gate start signal STV to the gate driving part 130. In addition, the timing control part 140 generates the gate clock signal CPV1 and the data clock signal CPV2 using the clock signal CLK, and outputs the gate clock signal CPV1 to the gate driving part 120 and outputs the data clock signal CPV2 to the data driving part 130.

The display apparatus 100 may further include a light source part 150 providing a light L to the display panel 110. In an exemplary embodiment, the light source part 150 may be a light emitting diode ("LED"), for example.

Figure 2:
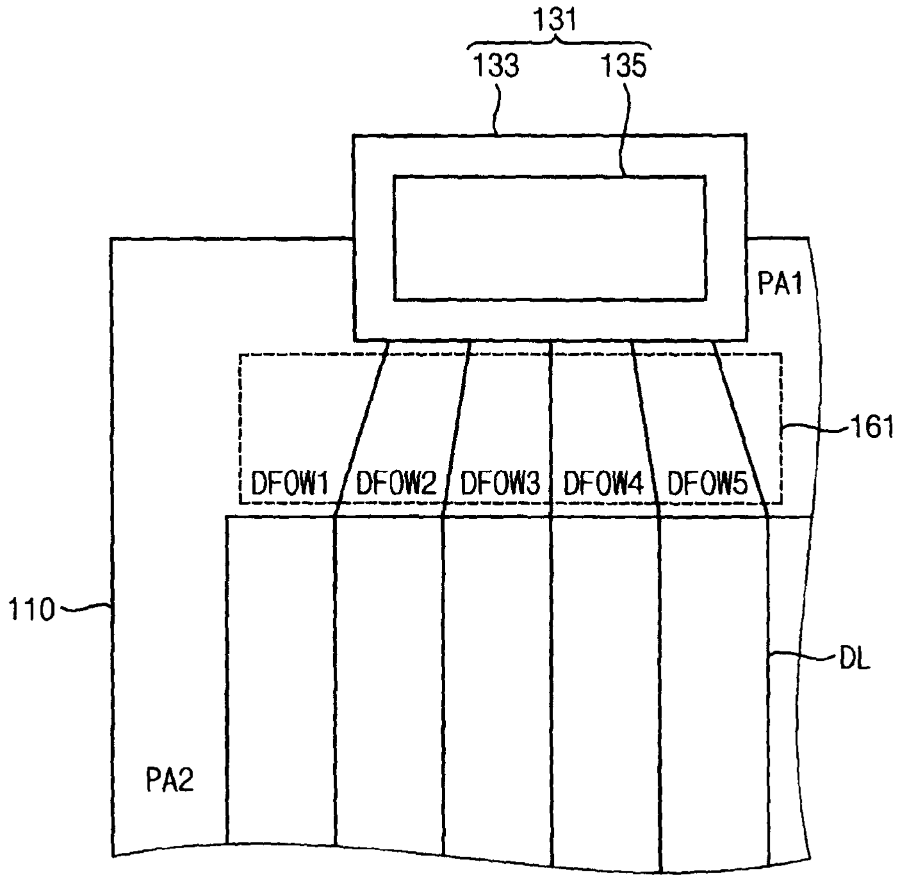
FIG. 2 is an enlarged plan view illustrating a portion 'A' of FIG. 1.

FIG. 2 is an enlarged plan view illustrating a portion 'A' of FIG. 1.

Referring to FIGS. 1 and 2, the data driving part 130 may include a plurality of data driving integrated circuit ("IC") parts 131. Each of the plurality of data driving IC parts 131 may have tape carrier package ("TCP") type. Thus, each of the plurality of data driving IC parts 131 may include a data driving film 133 and a data driving IC 135. The data driving film 133 is attached to the first peripheral area PA1 of the display panel 110. The data driving IC 135 is disposed on the data driving film 133 and outputs the data signals applied to the data lines DL.

The display panel 110 may include a data fan-out line portion 161 including data fan-out lines DFOW1, DFOW2, DFOW3, DFOW4 and DFOW5 electrically connecting the data driving film 133 of the data driving IC part 131 with the data lines DL and having different lengths. Thus, resistances of the data fan-out lines DFOW1, DFOW2, DFOW3, DFOW4 and DFOW5 may be different according to the different lengths.

In an exemplary embodiment, the data fan-out line portion 161 may include a first data fan-out line DFOW1, a second data fan-out line DFOW2, a third data fan-out line DFOW3, a fourth data fan-out line DFOW4 and a fifth data fan-out line DFOW5, for example. However, the invention is not limited thereto and the data fan-out line portion 161 may include more than five fan-out lines. In addition, each of a length of the first data fan-out line DFOW1 and a length of the fifth data fan-out line DFOW5 may be longer than each of a length of the second data fan-out line DFOW2 and a length of the fourth data fan-out line DFOW4, and each of the length of the second data fan-out line DFOW2 and the length of the fourth data fan-out line DFOW4 may be longer than a length of the third data fan-out line DFOW3. Thus, each of the first data fan-out line DFOW1 and the fifth data fan-out line DFOW5 may have a first length, each of the second data fan-out line DFOW2 and the fourth data fan-out line DFOW4 may have a second length shorter than the first length, and the third data fan-out line DFOW3 may have a third length shorter than the second length. Therefore, each of the first data fan-out line DFOW1 and the fifth data fan-out line DFOW5 may have a first resistance, each of the second data fan-out line DFOW2 and the fourth data fan-out line DFOW4 may have a second resistance less than the first resistance, and the third data fan-out line DFOW3 may have a third resistance less than the second resistance.

Figure 3:
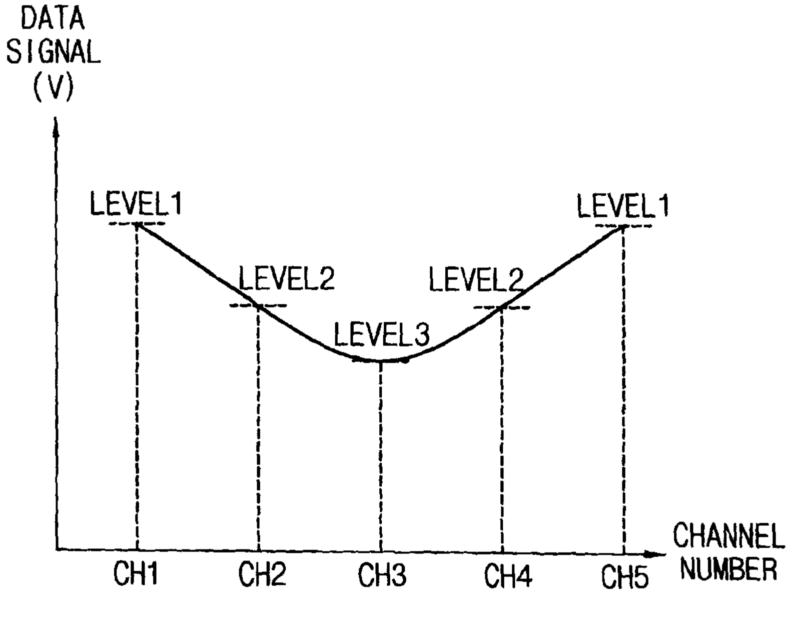
FIG. 3 is a graph illustrating data signals outputted from a data driving integrated circuit ("IC") of FIG. 2 through channels.

FIG. 3 is a graph illustrating the data signals outputted from the data driving IC 135 of FIG. 2 through channels.

Referring to FIGS. 1 to 3, the data driving IC 135 outputs data signals having different levels according to the lengths of the data fan-out lines DFOW1, DFOW2, DFOW3, DFOW4 and DFOW5 through channels CH1, CH2, CH3, CH4 and CH5 respectively connected to the data fan-out lines DFOW1, DFOW2, DFOW3, DFOW4 and DFOW5.

Specifically, the data driving IC 135 outputs a data signal having a first level LEVEL1 through a first channel CH1 electrically connected to the first data fan-out line DFOW1 having the first length, outputs a data signal having a second level LEVEL2 less than the first level LEVEL1 through a second channel CH2 electrically connected to the second data fan-out line DFOW2 having the second length shorter than the first length, and outputs a data signal having a third level LEVEL3 less than the second level LEVEL2 through a third channel CH3 electrically connected to the third data fan-out line DFOW3 having the third length shorter than the second length. In addition, the data driving IC 135 outputs a data signal having the second level LEVEL2 greater than the third level LEVEL3 through a fourth channel CH4 electrically connected to the fourth data fan-out line DFOW4 having the second length longer than the third length, and outputs a data signal having the first level LEVEL1 greater than the second level LEVEL2 through a fifth channel CH5 electrically connected to the fifth data fan-out line DFOW5 having the first length longer than the second length.

According to the illustrated exemplary embodiment, the data driving IC 135 outputs the data signals having the different levels according to the lengths of the data fan-out lines DFOW1, DFOW2, DFOW3, DFOW4 and DFOW5, therefore the different resistances of the data fan-out lines DFOW1, DFOW2, DFOW3, DFOW4 and DFOW5 may be compensated. Thus, display quality of the display apparatus 100 may be improved.

In an exemplary embodiment, each of the data fan-out lines DFOW1, DFOW2, DFOW3, DFOW4 and DFOW5 has straight line type, therefore a width of the first peripheral area PA1 of the display panel 110 in which the data fan-out lines DFOW1, DFOW2, DFOW3, DFOW4 and DFOW5 are disposed may be decreased. Thus, a width of a black matrix of the display panel 110 may be decreased and a width of a bezel of the display apparatus 100 may be decreased.

Figure 4:
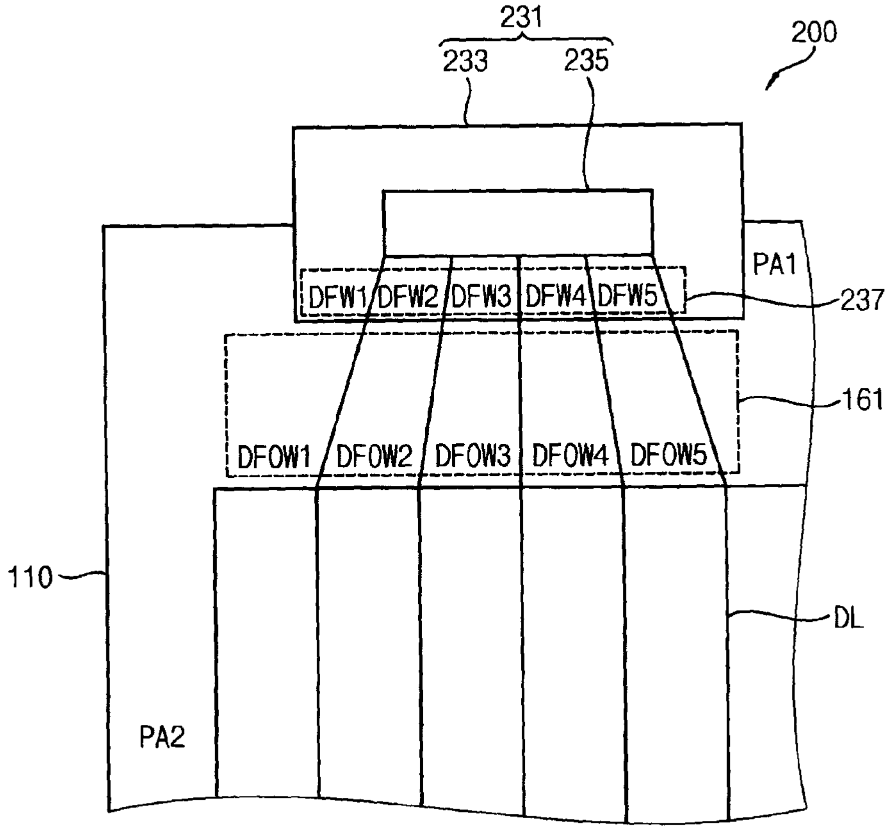
FIG. 4 is a plan view illustrating to another exemplary embodiment of a portion of a display apparatus according the invention.

FIG. 4 is a plan view illustrating a portion of a display apparatus according to another exemplary embodiment of the invention.

Referring to FIG. 4, the display apparatus 200 according to the illustrated exemplary embodiment includes a display panel 110 and a data driving IC part 231. In addition, the display apparatus 200 may further include the gate driving part 120, the timing control part 140 and the light source part 150 according to the previous exemplary embodiment illustrated in FIG. 1.

The display panel 110 and the data driving IC part 231 according to the illustrated exemplary embodiment may be in the display apparatus 100 according to the previous exemplary embodiment illustrated in FIG. 1, and the data driving IC part 231 according to the illustrated exemplary embodiment may be in the data driving part 130 according to the previous exemplary embodiment illustrated in FIG. 1, and the display panel 110 according to the illustrated exemplary embodiment may be substantially the same as the display panel 110 according to the previous exemplary embodiment illustrated in FIGS. 1 and 2. Thus, the same reference numerals will be used to refer to same or similar parts as those described in the previous exemplary embodiment and any further repetitive explanation concerning the above elements will be omitted.

The display panel 110 receives the data signal based on the image data DATA to display an image. The display panel 110 includes the display area DA displaying the image, the first peripheral area PA1 disposed around the display area DA and adjacent to the data driving part 130 and the second peripheral area PA2 disposed around the display area DA and adjacent to the gate driving part 120. The display area DA of the display panel 110 includes the gate lines GL, the data lines DL and the plurality of pixels P. In addition, the display panel 110 may include the data fan-out line portion 161 including the data fan-out lines DFOW1, DFOW2, DFOW3, DFOW4 and DFOW5 electrically connecting the data driving IC part 231 with the data lines DL and having the different lengths. Thus, the resistances of the data fan-out lines DFOW1, DFOW2, DFOW3, DFOW4 and DFOW5 may be different according to the different lengths.

In an exemplary embodiment, each of the first data fan-out line DFOW1 and the fifth data fan-out line DFOW5 may have the first length, each of the second data fan-out line DFOW2 and the fourth data fan-out line DFOW4 may have the second length shorter than the first length, and the third data fan-out line DFOW3 may have the third length shorter than the second length for example. Therefore, each of the first data fan-out line DFOW1 and the fifth data fan-out line DFOW5 may have the first resistance, each of the second data fan-out line DFOW2 and the fourth data fan-out line DFOW4 may have the second resistance less than the first resistance, and the third data fan-out line DFOW3 may have the third resistance less than the second resistance.

The data driving part 130 may include a plurality of the data driving IC parts 231. Each of the plurality of data driving IC parts 231 may have TCP type. Thus, each of the plurality of data driving IC parts 231 may include a data driving film 233, a data driving IC 235 and a data film line portion 237. The data driving film 233 is attached to the first peripheral area PA1 of the display panel 110. The data driving IC 235 is disposed on the data driving film 233 and outputs the data signals applied to the data lines DL. The data film line portion 237 is disposed on the data driving film 233 and includes data film lines DFW1, DFW2, DFW3, DFW4 and DFW5 electrically connecting the data driving IC 235 with the data fan-out lines DFOW1, DFOW2, DFOW3, DFOW4 and DFOW5.

The data film lines DFW1, DFW2, DFW3, DFW4 and DFW5 may have different lengths. Thus, resistances of the data film lines DFW1, DFW2, DFW3, DFW4 and DFW5 may be different according to the different lengths.

In an exemplary embodiment, the data film lines DFW1, DFW2, DFW3, DFW4 and DFW5 may have a first data film line DFW1, a second data film line DFW2, a third data film line DFW3, a fourth data film line DFW4 and a fifth data film line DFW5, for example. In addition, each of a length of the first data film line DFW1 and a length of the fifth data film line DFW5 may be longer than each of a length of the second data film line DFW2 and a length of the fourth data film line DFW4, and each of the length of the second data film line DFW2 and the length of the fourth data film line DFW4 may be longer than a length of the third data film line DFW3. Thus, each of the first data film line DFW1 and the fifth data film line DFW5 may have a fourth length, each of the second data film line DFW2 and the fourth data film line DFW4 may have a fifth length shorter than the fourth length, and the third data film line DFW3 may have a sixth length shorter than the fifth length. Therefore, each of the first data film line DFW1 and the fifth data film line DFW5 may have a fourth resistance, each of the second data film line DFW2 and the fourth data film line DFW4 may have a fifth resistance less than the fourth resistance, and the third data film line DFW3 may have a sixth resistance less than the fifth resistance.

In an exemplary embodiment, the first data fan-out line DFOW1 and the first data film line DFW1 may have a seventh length, the second data fan-out line DFOW2 and the second data film line DFW2 may have an eighth length shorter than the seventh length, the third data fan-out line DFOW3 and the third data film line DFW3 may have a ninth length shorter than the eighth length, the fourth data fan-out line DFOW4 and the fourth data film line DFW4 may have the eighth length longer than the ninth length, and the fifth data fan-out line DFOW5 and the fifth data film line DFW5 may have the seventh length longer than the eighth length. Thus, the first data fan-out line DFOW1 and the first data film line DFW1 may have a seventh resistance, the second data fan-out line DFOW2 and the second data film line DFW2 may have an eighth resistance less than the seventh resistance, the third data fan-out line DFOW3 and the third data film line DFW3 may have a ninth resistance less than the eighth resistance, the fourth data fan-out line DFOW4 and the fourth data film line DFW4 may have the eighth resistance greater than the ninth resistance, and the fifth data fan-out line DFOW5 and the fifth data film line DFW5 may have the seventh resistance greater than the eighth resistance.

Figure 5:
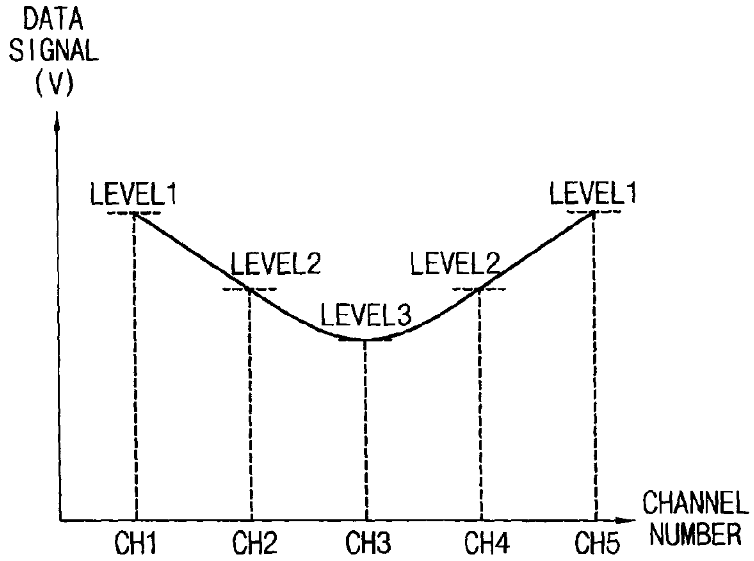
FIG. 5 is a graph illustrating data signals outputted from a data driving IC of FIG. 4 through channels.

FIG. 5 is a graph illustrating data signals outputted from the data driving IC 235 of FIG. 4 through channels.

Referring to FIGS. 4 and 5, the data driving IC 235 outputs data signals having different levels according to the lengths of the data fan-out lines DFOW1, DFOW2, DFOW3, DFOW4 and DFOW5 and the data film lines DFW1, DFW2, DFW3, DFW4 and DFW5 through channels CH1, CH2, CH3, CH4 and CH5 respectively connected to the data film lines DFW1, DFW2, DFW3, DFW4 and DFW5.

Specifically, the data driving IC 235 outputs a data signal having a first level LEVEL1 through a first channel CH1 electrically connected to the first data fan-out line DFOW1 and the first data film line DFW1 having the seventh length, outputs a data signal having a second level LEVEL2 less than the first level LEVEL1 through a second channel CH2 electrically connected to the second data fan-out line DFOW2 and the second data film line DFW2 having the eighth length shorter than the seventh length, outputs a data signal having a third level LEVEL3 less than the second level LEVEL2 through a third channel CH3 electrically connected to the third data fan-out line DFOW3 and the third data film line DFW3 having the ninth length shorter than the eighth length. In addition, the data driving IC 235 outputs a data signal having the second level LEVEL2 greater than the third level LEVEL3 through a fourth channel CH4 electrically connected to the fourth data fan-out line DFOW4 and the fourth data film line DFW4 having the eighth length longer than the ninth length, and outputs a data signal having the first level LEVEL1 greater than the second level LEVEL2 through a fifth channel CH5 electrically connected to the fifth data fan-out line DFOW5 and the fifth data film line DFW5 having the seventh length longer than the eighth length.

According to the illustrated exemplary embodiment, the data driving IC 235 outputs data signals having the different levels according to the lengths of the data fan-out lines DFOW1, DFOW2, DFOW3, DFOW4 and DFOW5 and the data film lines DFW1, DFW2, DFW3, DFW4 and DFW5, therefore the different resistances of the data fan-out lines DFOW1, DFOW2, DFOW3, DFOW4 and DFOW5 and the data film lines DFW1, DFW2, DFW3, DFW4 and DFW5 may be compensated. Thus, display quality of the display apparatus 200 may be improved.

In an exemplary embodiment, each of the data film lines DFW1, DFW2, DFW3, DFW4 and DFW5 has straight line type, therefore a width of the data driving film 233 in which the data film lines DFW1, DFW2, DFW3, DFW4 and DFW5 are disposed may be decreased and a width of the first peripheral area PA1 of the display panel 110 to which the data driving film 233 is attached may be decreased. Thus, a width of a black matrix of the display panel 110 may be decreased and a width of a bezel of the display apparatus 200 may be decreased.

Figure 6:
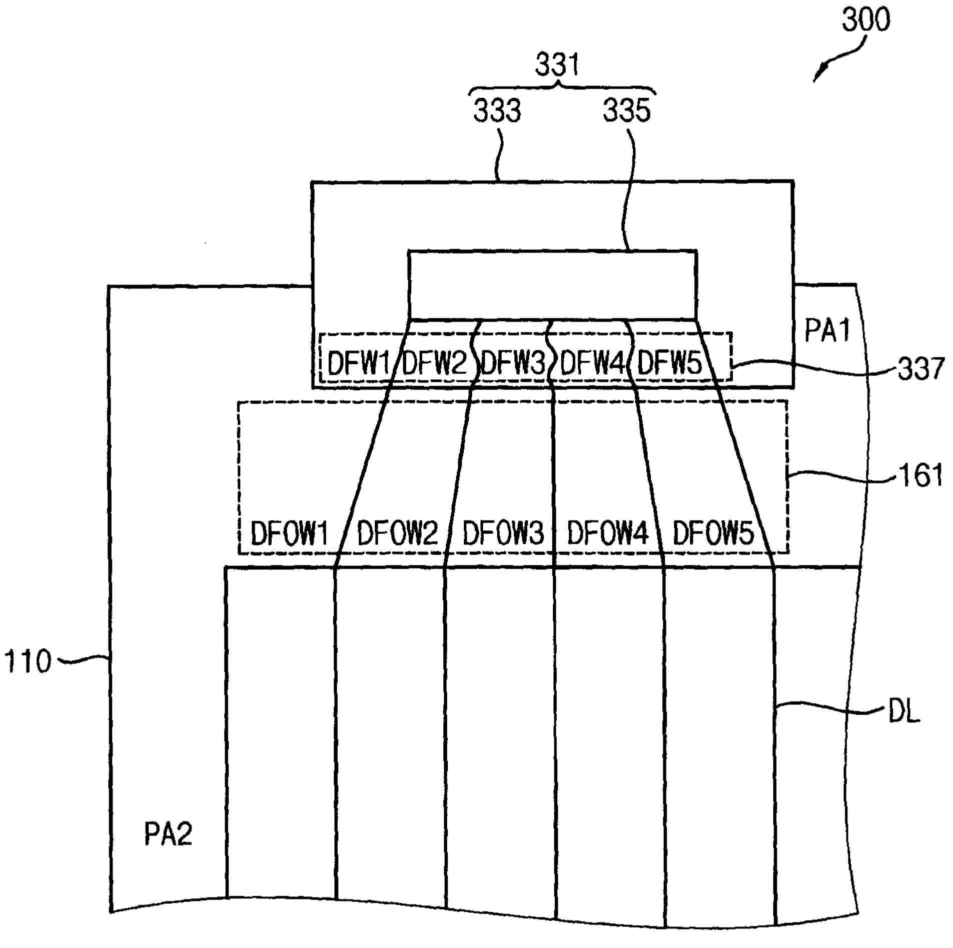
FIG. 6 is a plan view illustrating another exemplary embodiment a portion of a display apparatus according to of the invention.

FIG. 6 is a plan view illustrating a portion of a display apparatus according to another exemplary embodiment of the invention.

Referring to FIG. 6, the display apparatus 300 according to the illustrated exemplary embodiment includes a display panel 110 and a data driving IC part 331. In addition, the display apparatus 300 may further include the gate driving part 120, the timing control part 140 and the light source part 150 according to the previous exemplary embodiment illustrated in FIG. 1.

The display panel 110 and the data driving IC part 331 according to the illustrated exemplary embodiment may be in the display apparatus 100 according to the previous exemplary embodiment illustrated in FIG. 1, and the data driving IC part 331 according to the illustrated exemplary embodiment may be in the data driving part 130 according to the previous exemplary embodiment illustrated in FIG. 1, and the display panel 110 according to the illustrated exemplary embodiment may be substantially the same as the display panel 110 according to the previous exemplary embodiment illustrated in FIGS. 1 and 2. Thus, the same reference numerals will be used to refer to same or similar parts as those described in the previous exemplary embodiment and any further repetitive explanation concerning the above elements will be omitted.

The display panel 110 receives the data signal based on the image data DATA to display an image. The display panel 110 includes the display area DA displaying the image, the first peripheral area PA1 disposed around the display area DA and adjacent to the data driving part 130 and the second peripheral area PA2 disposed around the display area DA and adjacent to the gate driving part 120. The display area DA of the display panel 110 includes the gate lines GL, the data lines DL and the plurality of pixels P. In addition, the display panel 110 may include the data fan-out line portion 161 including the data fan-out lines DFOW1, DFOW2, DFOW3, DFOW4 and DFOW5 electrically connecting the data driving IC part 331 with the data lines DL and having the different lengths. Thus, the resistances of the data fan-out lines DFOW1, DFOW2, DFOW3, DFOW4 and DFOW5 may be different according to the different lengths.

In an exemplary embodiment, each of the first data fan-out line DFOW1 and the fifth data fan-out line DFOW5 may have the first length, each of the second data fan-out line DFOW2 and the fourth data fan-out line DFOW4 may have the second length shorter than the first length, and the third data fan-out line DFOW3 may have the third length shorter than the second length, for example. Therefore, each of the first data fan-out line DFOW1 and the fifth data fan-out line DFOW5 may have the first resistance, each of the second data fan-out line DFOW2 and the fourth data fan-out line DFOW4 may have the second resistance less than the first resistance, and the third data fan-out line DFOW3 may have the third resistance less than the second resistance.

The data driving part 130 may include a plurality of the data driving IC parts 331. Each of plurality of the data driving IC parts 331 may have TCP type. Thus, each of the plurality of data driving IC parts 331 may include a data driving film 333, a data driving IC 335 and a data film line portion 337. The data driving film 333 is attached to the first peripheral area PA1 of the display panel 110. The data driving IC 335 is disposed on the data driving film 333 and outputs the data signals applied to the data lines DL. The data film line portion 337 is disposed on the data driving film 333 and includes data film lines DFW1, DFW2, DFW3, DFW4 and DFW5 electrically connecting the data driving IC 335 with the data fan-out lines DFOW1, DFOW2, DFOW3, DFOW4 and DFOW5.

The data film lines DFW1, DFW2, DFW3, DFW4 and DFW5 may have different lengths according to the lengths of the data fan-out lines DFOW1, DFOW2, DFOW3, DFOW4 and DFOW5. In an exemplary embodiment, the data film lines DFW1, DFW2, DFW3, DFW4 and DFW5 may have a first data film line DFW1, a second data film line DFW2, a third data film line DFW3, a fourth data film line DFW4 and a fifth data film line DFW5, for example. In addition, each of a length of the first data film line DFW1 and a length of the fifth data film line DFW5 may be shorter than each of a length of the second data film line DFW2 and a length of the fourth data film line DFW4, and each of the length of the second data film line DFW2 and the length of the fourth data film line DFW4 may be shorter than a length of the third data film line DFW3. Thus, each of the first data film line DFW1 and the fifth data film line DFW5 may have a tenth length, each of the second data film line DFW2 and the fourth data film line DFW4 may have an eleven length longer than the tenth length, and the third data film line DFW3 may have a twelfth length longer than the eleventh length.

Therefore, a length of the first data fan-out line DFOW1 and the first data film line DFW1, a length of the second data fan-out line DFOW2 and the second data film line DFW2, a length of the third data fan-out line DFOW3 and the third data film line DFW3, a length of fourth data fan-out line DFOW4 and the fourth data film line DFW4, and a length of the fifth data fan-out line DFOW5 and the fifth data film line DFW5 may be substantially the same. Thus, a resistance of the first data fan-out line DFOW1 and the first data film line DFW1, a resistance of the second data fan-out line DFOW2 and the second data film line DFW2, a resistance of the third data fan-out line DFOW3 and the third data film line DFW3, a resistance of fourth data fan-out line DFOW4 and the fourth data film line DFW4, and a resistance of the fifth data fan-out line DFOW5 and the fifth data film line DFW5 may be substantially the same.

Each of the second data film line DFW2 and the fourth data film line DFW4 may have a curved portion or a bent portion in order to have the eleventh length longer than the tenth length of each of the first data film line DFW1 and the fifth data film line DFW5. In addition, the third data film line DFW3 may have a curved portion or a bent portion in order to have the twelfth length longer than the eleventh length of each of the second data film line DFW2 and the fourth data film line DFW4.

According to the illustrated exemplary embodiment, the data film lines DFW1, DFW2, DFW3, DFW4 and DFW5 have the different lengths according to the lengths of the data fan-out lines DFOW1, DFOW2, DFOW3, DFOW4 and DFOW5, therefore the different resistances of the data fan-out lines DFOW1, DFOW2, DFOW3, DFOW4 and DFOW5 may be compensated. Thus, display quality of the display apparatus 300 may be improved.

In an exemplary embodiment, each of the data fan-out lines DFOW1, DFOW2, DFOW3, DFOW4 and DFOW5 has straight line type, therefore a width of the first peripheral area PA1 of the display panel 110 to which the data fan-out lines DFOW1, DFOW2, DFOW3, DFOW4 and DFOW5 are disposed. Thus, a width of a black matrix of the display panel 110 may be decreased and a width of a bezel of the display apparatus 300 may be decreased.

Figure 7:
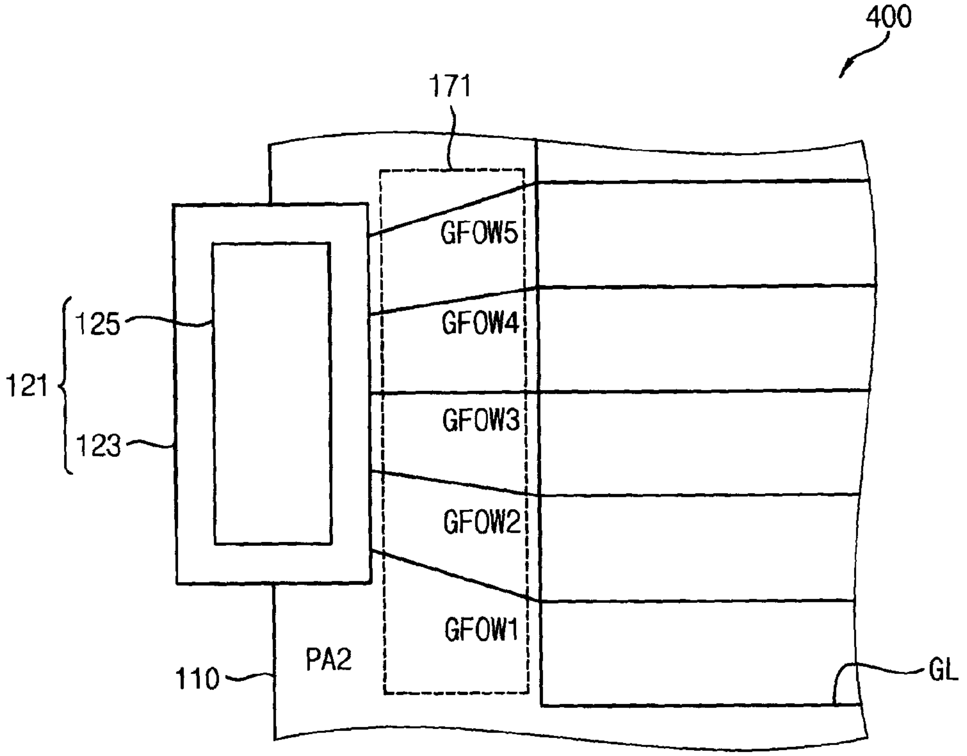
FIG. 7 is a plan view illustrating another exemplary embodiment a portion of a display apparatus according to the invention.

FIG. 7 is a plan view illustrating a portion of a display apparatus according to another exemplary embodiment of the invention.

Referring to FIG. 7, the display apparatus 400 according to the illustrated exemplary embodiment includes a display panel 110 and a gate driving IC part 121. In addition, the display apparatus 400 may further include the data driving part 130, the timing control part 140 and the light source part 150 according to the previous exemplary embodiment illustrated in FIG. 1.

The display panel 110 and the gate driving IC part 121 according to the illustrated exemplary embodiment may be in the display apparatus 100 according to the previous exemplary embodiment illustrated in FIG. 1, and the gate driving IC part 121 according to the illustrated exemplary embodiment may be in the gate driving part 120 according to the previous exemplary embodiment illustrated in FIG. 1, and the display panel 110 according to the illustrated exemplary embodiment may be substantially the same as the display panel 110 according to the previous exemplary embodiment illustrated in FIGS. 1 and 2. Thus, the same reference numerals will be used to refer to same or similar parts as those described in the previous exemplary embodiment and any further repetitive explanation concerning the above elements will be omitted.

The display panel 110 receives the data signal based on the image data DATA to display an image. The display panel 110 includes the display area DA displaying the image, the first peripheral area PA1 disposed around the display area DA and adjacent to the data driving part 130 and the second peripheral area PA2 disposed around the display area DA and adjacent to the gate driving part 120. The display area DA of the display panel 110 includes the gate lines GL, the data lines DL and the plurality of pixels P. In addition, the display panel 110 may include gate fan-out line portion 171 including gate fan-out lines GFOW1, GFOW2, GFOW3, GFOW4 and GFOW5 electrically connecting the gate driving IC part 121 with the gate lines GL and having different lengths. Thus, resistances of the gate fan-out lines GFOW1, GFOW2, GFOW3, GFOW4 and GFOW5 may be different.

In an exemplary embodiment, the gate fan-out line portion 171 may include a first gate fan-out line GFOW1, a second gate fan-out line GFOW2, a third gate fan-out line GFOW3, a fourth gate fan-out line GFOW4 and a fifth gate fan-out line GFOW5, for example. However, the invention is not limited thereto and the data fan-out line portion 171 may include more than five fan-out lines. In addition, each of the first gate fan-out line GFOW1 and the fifth gate fan-out line GFOW5 may have a thirteenth length, each of the second gate fan-out line GFOW2 and the fourth gate fan-out line GFOW4 may have a fourteenth length shorter than the thirteenth length, and the third gate fan-out line GFOW3 may have a fifteenth length shorter than the fourteenth length. Therefore, each of the first gate fan-out line GFOW1 and the fifth gate fan-out line GFOW5 may have a thirteenth resistance, each of the second gate fan-out line GFOW2 and the fourth gate fan-out line GFOW4 may have a fourteenth resistance less than the thirteenth resistance, and the third gate fan-out line GFOW3 may have a fifteenth resistance less than the fourteenth resistance.

The gate driving part 120 may include a plurality of the gate driving IC parts 121. Each of the gate driving IC parts 121 may have TCP type. Thus, each of the gate driving IC parts 121 may include a gate driving film 123 and a gate driving IC 125. The gate driving film 123 is attached to the second peripheral area PA2 of the display panel 110. The gate driving IC 125 is disposed on the gate driving film 123 and outputs the gate signals applied to the gate lines DL.

Figure 8:
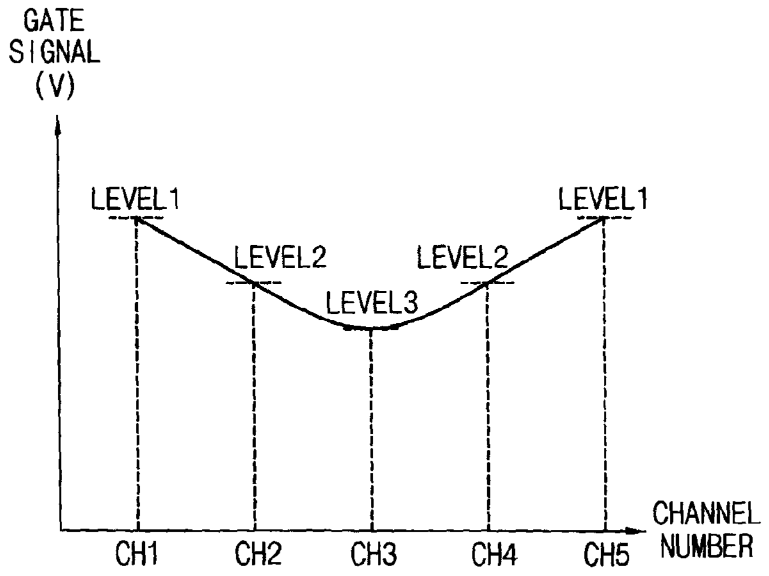
FIG. 8 is a graph illustrating gate signals outputted from a gate driving IC of FIG. 7 through channels.

FIG. 8 is a graph illustrating the gate signals outputted from the gate driving IC 125 of FIG. 7 through channels.

Referring to FIGS. 7 and 8, the gate driving IC 125 outputs gate signals having different levels according to the lengths of the gate fan-out lines GFOW1, GFOW2, GFOW3, GFOW4 and GFOW5 through channels CH1, CH2, CH3, CH4 and CH5 respectively connected to the gate fan-out lines GFOW1, GFOW2, GFOW3, GFOW4 and GFOW5.

Specifically, the gate driving IC 125 outputs a gate signal having a first level LEVEL1 through a first channel CH1 electrically connected to the first gate fan-out line GFOW1 having the thirteenth length, outputs a gate signal having a second level LEVEL2 less than the first level LEVEL1 through a second channel CH2 electrically connected to the second gate fan-out line GFOW2 having the fourteenth length shorter than the thirteenth length, and outputs a gate signal having a third level LEVEL3 less than the second level LEVEL2 through a third channel CH3 electrically connected to the third gate fan-out line GFOW3 having the fifteenth length shorter than the fourteenth length. In addition, the gate driving IC 125 outputs a gate signal having the second level LEVEL2 greater than the third level LEVEL3 through a fourth channel CH4 electrically connected to the fourth gate fan-out line GFOW4 having the fourteenth length longer than the fifteenth length, and outputs a gate signal having the first level LEVEL1 greater than the second level LEVEL2 through a fifth channel CH5 electrically connected to the fifth gate fan-out line GFOW5 having the thirteenth length longer than the fourteenth length.

According to the illustrated exemplary embodiment, the gate driving IC 125 outputs the gate signals having the different levels according to the lengths of the gate fan-out lines GFOW1, GFOW2, GFOW3, GFOW4 and GFOW5, therefore the different resistances of the gate fan-out lines GFOW1, GFOW2, GFOW3, GFOW4 and GFOW5 may be compensated. Thus, display quality of the display apparatus 400 may be improved.

In an exemplary embodiment, each of the gate fan-out lines GFOW1, GFOW2, GFOW3, GFOW4 and GFOW5 has straight line type, therefore a width of the second peripheral area PA2 of the display panel 110 in which the gate fan-out lines GFOW1, GFOW2, GFOW3, GFOW4 and GFOW5 are disposed may be decreased. Thus, a width of a black matrix of the display panel 110 may be decreased and a width of a bezel of the display apparatus 400 may be decreased.

Figure 9:
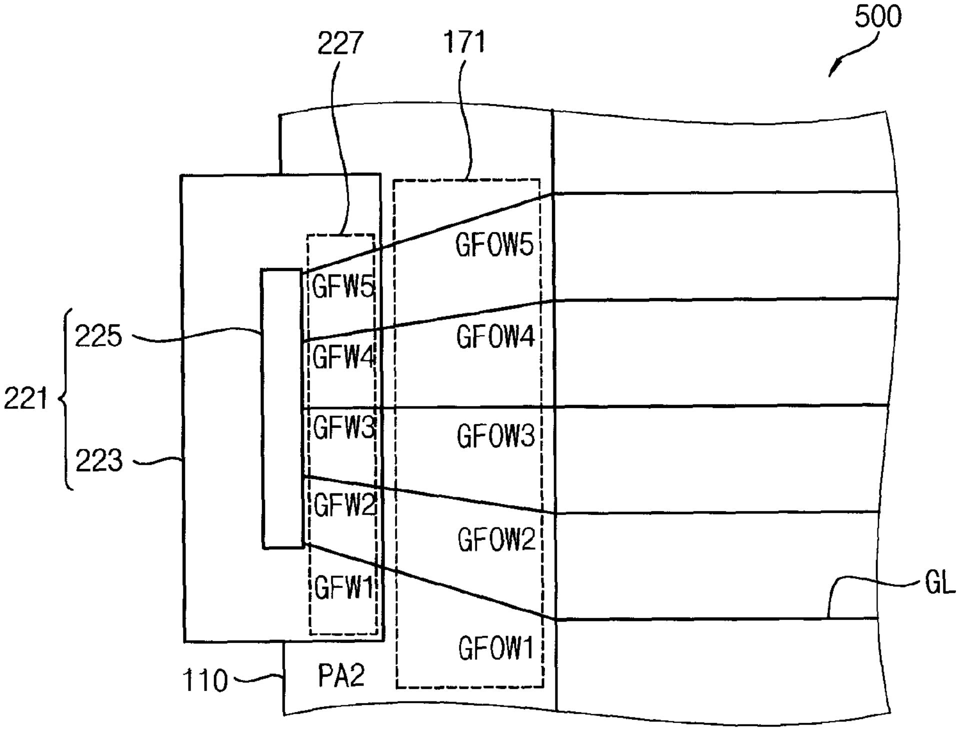
FIG. 9 is a plan view illustrating another exemplary embodiment a portion of a display apparatus according to the invention.

FIG. 9 is a plan view illustrating a portion of a display apparatus according to another exemplary embodiment of the invention.

Referring to FIG. 9, the display apparatus 500 according to the illustrated exemplary embodiment includes a display panel 110 and a gate driving IC part 221. In addition, the display apparatus 500 may further include the data driving part 130, the timing control part 140 and the light source part 150 according to the previous exemplary embodiment illustrated in FIG. 1.

The display panel 110 and the gate driving IC part 221 according to the illustrated exemplary embodiment may be in the display apparatus 100 according to the previous exemplary embodiment illustrated in FIG. 1, and the gate driving IC part 221 according to the illustrated exemplary embodiment may be in the gate driving part 120 according to the previous exemplary embodiment illustrated in FIG. 1, and the display panel 110 according to the illustrated exemplary embodiment may be substantially the same as the display panel 110 according to the previous exemplary embodiment illustrated in FIGS. 1 and 2. Thus, the same reference numerals will be used to refer to same or similar parts as those described in the previous exemplary embodiment and any further repetitive explanation concerning the above elements will be omitted.

The display panel 110 receives the data signal based on the image data DATA to display an image. The display panel 110 includes the display area DA displaying the image, the first peripheral area PA1 disposed around the display area DA and adjacent to the data driving part 130 and the second peripheral area PA2 disposed around the display area DA and adjacent to the gate driving part 120. The display area DA of the display panel 110 includes the gate lines GL, the data lines DL and the plurality of pixels P. In addition, the display panel 110 may include the gate fan-out line portion 171 including the gate fan-out lines GFOW1, GFOW2, GFOW3, GFOW4 and GFOW5 electrically connecting the gate driving IC part 221 with the gate lines GL and having the different lengths. Thus, the resistances of the gate fan-out lines GFOW1, GFOW2, GFOW3, GFOW4 and GFOW5 may be different according to the different lengths.

In an exemplary embodiment, each of the first gate fan-out line GFOW1 and the fifth gate fan-out line GFOW5 may have the thirteenth length, each of the second gate fan-out line GFOW2 and the fourth gate fan-out line GFOW4 may have the fourteenth length shorter than the thirteenth length, and the third gate fan-out line GFOW3 may have the fifteenth length shorter than the fourteenth length, for example. Therefore, each of the first gate fan-out line GFOW1 and the fifth gate fan-out line GFOW5 may have the thirteenth resistance, each of the second gate fan-out line GFOW2 and the fourth gate fan-out line GFOW4 may have the fourteenth resistance less than the thirteenth resistance, and the third gate fan-out line GFOW3 may have the fifteenth resistance less than the fourteenth resistance.

The gate driving part 120 may include a plurality of the gate driving IC parts 221. Each of the gate driving IC parts 221 may have TCP type. Thus, each of the gate driving IC parts 221 may include a gate driving film 223, a gate driving IC 225 and a gate film line portion 227. The gate driving film 223 is attached to the second peripheral area PA2 of the display panel 110. The gate driving IC 225 is disposed on the gate driving film 223 and outputs the gate signals applied to the gate lines GL. The gate film line portion 227 is disposed on the gate driving film 223 and includes gate film lines GFW1, GFW2, GFW3, GFW4 and GFW5 electrically connecting the gate driving IC 225 with the gate fan-out lines GFOW1, GFOW2, GFOW3, GFOW4 and GFOW5.

The gate film lines GFW1, GFW2, GFW3, GFW4 and GFW5 may have different lengths. Thus, resistances of the gate film lines GFW1, GFW2, GFW3, GFW4 and GFW5 may be different.

In an exemplary embodiment, the gate film lines GFW1, GFW2, GFW3, GFW4 and GFW5 may have a first gate film line GFW1, a second gate film line GFW2, a third gate film line GFW3, a fourth gate film line GFW4 and a fifth gate film line GFW5, for example. In an exemplary embodiment, each of a length of the first gate film line GFW1 and a length of the fifth gate film line GFW5 may be longer than each of a length of the second gate film line GFW2 and a length of the fourth gate film line GFW4, and each of the length of the second gate film line GFW2 and the length of the fourth gate film line GFW4 may be longer than a length of the third gate film line GFW3. Thus, each of the first gate film line GFW1 and the fifth gate film line GFW5 may have a sixteenth length, each of the second gate film line GFW2 and the fourth gate film line GFW4 may have a seventeenth length shorter than the sixteenth length, and the third gate film line GFW3 may have an eighteenth length shorter than the seventeenth length. Therefore, each of the first gate film line GFW1 and the fifth gate film line GFW5 may have a sixteenth resistance, each of the second gate film line GFW2 and the fourth gate film line GFW4 may have a seventeenth resistance less than the sixteenth resistance, and the third gate film line GFW3 may have an eighteenth resistance less than the seventeenth resistance.

In an exemplary embodiment, the first gate fan-out line GFOW1 and the first gate film line GFW1 may have a nineteenth length, the second gate fan-out line GFOW2 and the second gate film line GFW2 may have a twentieth length shorter than the nineteenth length, the third gate fan-out line GFOW3 and the third gate film line GFW3 may have a twenty-first length shorter than the twentieth length, the fourth gate fan-out line GFOW4 and the fourth gate film line GFW4 may have the twentieth length longer than the twenty-first length, and the fifth gate fan-out line GFOW5 and the fifth gate film line GFW5 may have the nineteenth length longer than the twentieth length. Thus, the first gate fan-out line GFOW1 and the first gate film line GFW1 may have a nineteenth resistance, the second gate fan-out line GFOW2 and the second gate film line GFW2 may have a twentieth resistance less than the nineteenth resistance, the third gate fan-out line GFOW3 and the third gate film line GFW3 may have a twenty-first resistance less than the twentieth resistance, the fourth gate fan-out line GFOW4 and the fourth gate film line GFW4 may have the twentieth resistance greater than the twenty-first resistance, and the fifth gate fan-out line GFOW5 and the fifth gate film line GFW5 may have the nineteenth resistance greater than the twentieth resistance.

Figure 10:
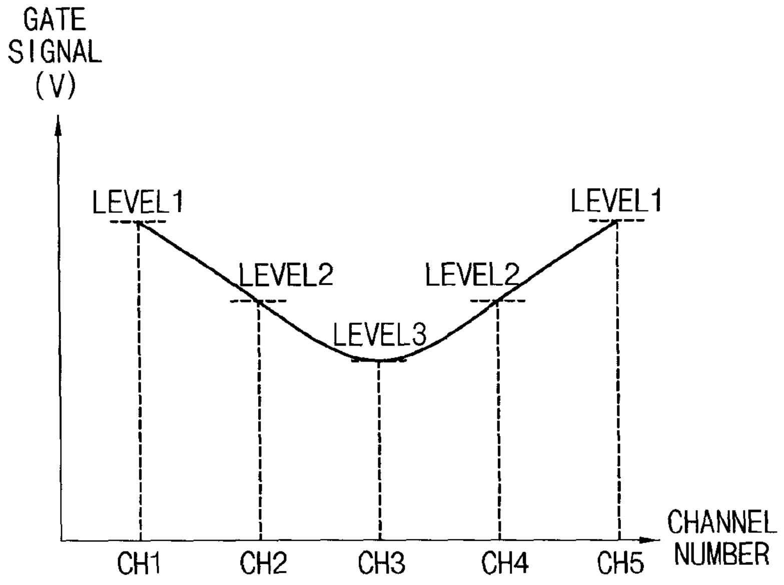
FIG. 10 is a graph illustrating gate signals outputted from a gate driving IC of FIG. 9 through channels.

FIG. 10 is a graph illustrating gate signals outputted from the gate driving IC 225 of FIG. 9 through channels.

Referring to FIGS. 9 and 10, the gate driving IC 225 outputs gate signals having different levels according to the lengths of the gate fan-out lines GFOW1, GFOW2, GFOW3, GFOW4 and GFOW5 and the gate film lines GFW1, GFW2, GFW3, GFW4 and GFW5 through channels CH1, CH2, CH3, CH4 and CH5 respectively connected to the gate film lines GFW1, GFW2, GFW3, GFW4 and GFW5.

Specifically, the gate driving IC 225 outputs a gate signal having a first level LEVEL1 through a first channel CH1 electrically connected to the first gate fan-out line GFOW1 and the first gate film line GFW1 having the nineteenth length, outputs a gate signal having a second level LEVEL2 less than the first level LEVEL1 through a second channel CH2 electrically connected to the second gate fan-out line GFOW2 and the second gate film line GFW2 having the twentieth length shorter than the nineteenth length, outputs a gate signal having a third level LEVEL3 less than the second level LEVEL2 through a third channel CH3 electrically connected to the third gate fan-out line GFOW3 and the third gate film line GFW3 having the twenty-first length shorter than the twentieth length. In addition, the gate driving IC 225 outputs a gate signal having the second level LEVEL2 greater than the third level LEVEL3 through a fourth channel CH4 electrically connected to the fourth gate fan-out line GFOW4 and the fourth gate film line GFW4 having the twentieth length longer than the twenty-first length, and outputs a gate signal having the first level LEVEL1 greater than the second level LEVEL2 through a fifth channel CH5 electrically connected to the fifth gate fan-out line GFOW5 and the fifth gate film line GFW5 having the nineteenth length longer than the twentieth length.

According to the illustrated exemplary embodiment, the gate driving IC 225 outputs gate signals having the different levels according to the lengths of the gate fan-out lines GFOW1, GFOW2, GFOW3, GFOW4 and GFOW5 and the gate film lines GFW1, GFW2, GFW3, GFW4 and GFW5, therefore the different resistances of the gate fan-out lines GFOW1, GFOW2, GFOW3, GFOW4 and GFOW5 and the gate film lines GFW1, GFW2, GFW3, GFW4 and GFW5 may be compensated. Thus, display quality of the display apparatus 500 may be improved.

In an exemplary embodiment, each of the gate film lines GFW1, GFW2, GFW3, GFW4 and GFW5 has straight line type, therefore a width of the gate driving film 223 in which the gate film lines GFW1, GFW2, GFW3, GFW4 and GFW5 are disposed may be decreased and a width of the second peripheral area PA2 of the display panel 110 to which the gate driving film 223 is attached may be decreased. Thus, a width of a black matrix of the display panel 110 may be decreased and a width of a bezel of the display apparatus 500 may be decreased.

Figure 11:
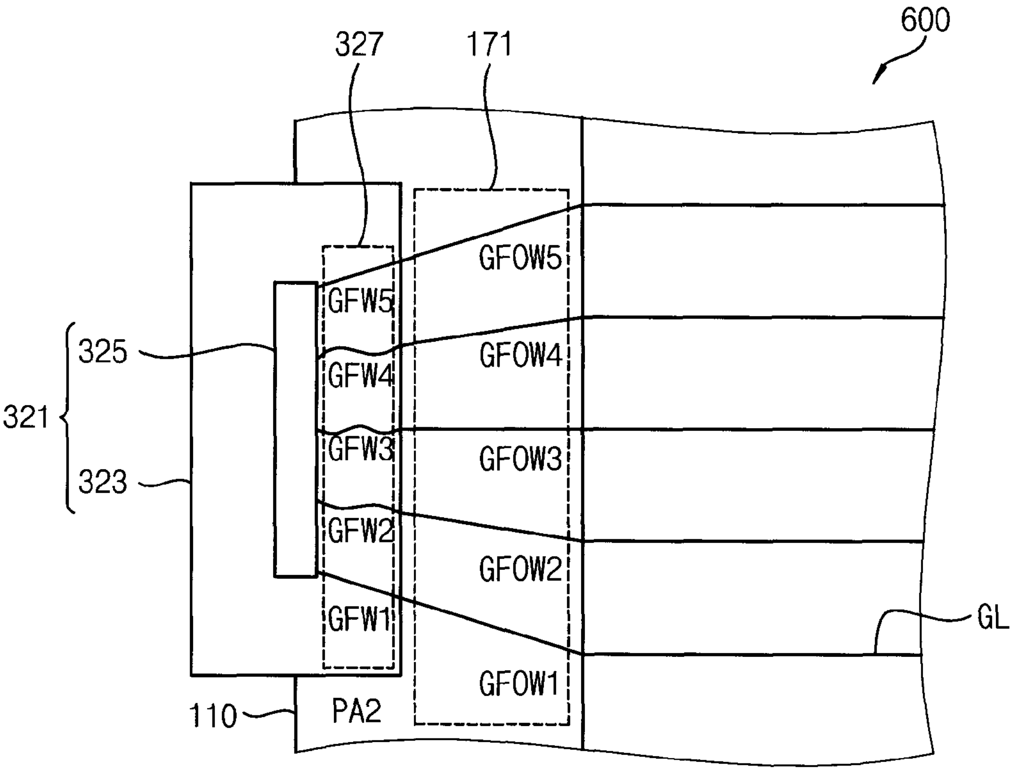
FIG. 11 is a plan view illustrating another exemplary embodiment of a portion of a display apparatus according to the invention.

FIG. 11 is a plan view illustrating a portion of a display apparatus according to another exemplary embodiment of the invention.

Referring to FIG. 11, the display apparatus 600 according to the illustrated exemplary embodiment includes a display panel 110 and a gate driving IC part 321. In addition, the display apparatus 600 may further include the data driving part 130, the timing control part 140 and the light source part 150 according to the previous exemplary embodiment illustrated in FIG. 1.

The display panel 110 and the gate driving IC part 321 according to the illustrated exemplary embodiment may be in the display apparatus 100 according to the previous exemplary embodiment illustrated in FIG. 1, and the gate driving IC part 321 according to the illustrated exemplary embodiment may be in the gate driving part 120 according to the previous exemplary embodiment illustrated in FIG. 1, and the display panel 110 according to the illustrated exemplary embodiment may be substantially the same as the display panel 110 according to the previous exemplary embodiment illustrated in FIGS. 1 and 2. Thus, the same reference numerals will be used to refer to same or similar parts as those described in the previous exemplary embodiment and any further repetitive explanation concerning the above elements will be omitted.

The display panel 110 receives the data signal based on the image data DATA to display an image. The display panel 110 includes the display area DA displaying the image, the first peripheral area PA1 disposed around the display area DA and adjacent to the data driving part 130 and the second peripheral area PA2 disposed around the display area DA and adjacent to the gate driving part 120. The display area DA of the display panel 110 includes the gate lines GL, the data lines DL and the plurality of pixels P. In addition, the display panel 110 may include the gate fan-out line portion 171 including the gate fan-out lines GFOW1, GFOW2, GFOW3, GFOW4 and GFOW5 electrically connecting the gate driving IC part 321 with the gate lines GL and having the different lengths. Thus, the resistances of the gate fan-out lines GFOW1, GFOW2, GFOW3, GFOW4 and GFOW5 may be different according to the different lengths.

In an exemplary embodiment, each of the first gate fan-out line GFOW1 and the fifth gate fan-out line GFOW5 may have the thirteenth length, each of the second gate fan-out line GFOW2 and the fourth gate fan-out line GFOW4 may have the fourteenth length shorter than the thirteenth length, and the third gate fan-out line GFOW3 may have the fifteenth length shorter than the fourteenth length, for example. Therefore, each of the first gate fan-out line GFOW1 and the fifth gate fan-out line GFOW5 may have the thirteenth resistance, each of the second gate fan-out line GFOW2 and the fourth gate fan-out line GFOW4 may have the fourteenth resistance less than the thirteenth resistance, and the third gate fan-out line GFOW3 may have the fifteenth resistance less than the fourteenth resistance.

The gate driving part 120 may include a plurality of the gate driving IC parts 321. Each of the gate driving IC parts 321 may have TCP type. Thus, each of the gate driving IC parts 321 may include a gate driving film 323, a gate driving IC 325 and a gate film line portion 327. The gate driving film 323 is attached to the second peripheral area PA2 of the display panel 110. The gate driving IC 325 is disposed on the gate driving film 323 and outputs the gate signals applied to the gate lines GL. The gate film line portion 327 is disposed on the gate driving film 323 and includes gate film lines GFW1, GFW2, GFW3, GFW4 and GFW5 electrically connecting the gate driving IC 325 with the gate fan-out lines GFOW1, GFOW2, GFOW3, GFOW4 and GFOW5.

The gate film lines GFW1, GFW2, GFW3, GFW4 and GFW5 may have different lengths according to the lengths of the gate fan-out lines GFOW1, GFOW2, GFOW3, GFOW4 and GFOW5. In an exemplary embodiment, the gate film lines GFW1, GFW2, GFW3, GFW4 and GFW5 may have a first gate film line GFW1, a second gate film line GFW2, a third gate film line GFW3, a fourth gate film line GFW4 and a fifth gate film line GFW5, for example. In addition, each of a length of the first gate film line GFW1 and a length of the fifth gate film line GFW5 may be shorter than each of a length of the second gate film line GFW2 and a length of the fourth gate film line GFW4, and each of the length of the second gate film line GFW2 and the length of the fourth gate film line GFW4 may be shorter than a length of the third gate film line GFW3. Thus, each of the first gate film line GFW1 and the fifth gate film line GFW5 may have a twenty-second length, each of the second gate film line GFW2 and the fourth gate film line GFW4 may have a twenty-third longer than the twenty-second length, and the third gate film line GFW3 may have a twenty-fourth length longer than the twenty-third length.

Therefore, a length of the first gate fan-out line GFOW1 and the first gate film line GFW1, a length of the second gate fan-out line GFOW2 and the second gate film line GFW2, a length of the third gate fan-out line GFOW3 and the third gate film line GFW3, a length of fourth gate fan-out line GFOW4 and the fourth gate film line GFW4, and a length of the fifth gate fan-out line GFOW5 and the fifth gate film line GFW5 may be substantially the same. Thus, a resistance of the first gate fan-out line GFOW1 and the first gate film line GFW1, a resistance of the second gate fan-out line GFOW2 and the second gate film line GFW2, a resistance of the third gate fan-out line GFOW3 and the third gate film line GFW3, a resistance of fourth gate fan-out line GFOW4 and the fourth gate film line GFW4, and a resistance of the fifth gate fan-out line GFOW5 and the fifth gate film line GFW5 may be substantially the same.

Each of the second gate film line GFW2 and the fourth gate film line GFW4 may have a curved portion or a bent portion in order to have the twenty-third length longer than the twenty-second length of each of the first gate film line GFW1 and the fifth gate film line GFW5. In addition, the third gate film line GFW3 may have curve portion or bend portion in order to have the twenty-fourth length longer than the twenty-third length of each of the second gate film line GFW2 and the fourth gate film line GFW4.

According to the illustrated exemplary embodiment, the gate film lines GFW1, GFW2, GFW3, GFW4 and GFW5 have the different lengths according to the lengths of the gate fan-out lines GFOW1, GFOW2, GFOW3, GFOW4 and GFOW5, therefore the different resistances of the gate fan-out lines GFOW1, GFOW2, GFOW3, GFOW4 and GFOW5 may be compensated. Thus, display quality of the display apparatus 600 may be improved.

In an exemplary embodiment, each of the gate fan-out lines GFOW1, GFOW2, GFOW3, GFOW4 and GFOW5 has straight line type, therefore a width of the second peripheral area PA2 of the display panel 110 to which the gate fan-out lines GFOW1, GFOW2, GFOW3, GFOW4 and GFOW5 are disposed. Thus, a width of a black matrix of the display panel 110 may be decreased and a width of a bezel of the display apparatus 600 may be decreased.

According to the display apparatus, different resistances of data fan-out lines and different resistances of gate fan-out lines may be compensated, and thus display quality of the display apparatus may be improved.

In addition, a width of a peripheral area in a display panel in which a data driving part and a gate driving part is decreased, and thus a width of a bezel of the display apparatus may be decreased.

The foregoing is illustrative of the invention and is not to be construed as limiting thereof. Although a few exemplary embodiments of the illustrated invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
a display panel comprising:
a display area in which gate lines and data lines are disposed to display an image, and
a peripheral area which is disposed around the display area and includes fan-out lines having different lengths; and
a driving part configured to output driving signals having different levels to channels respectively connected to the fan-out lines, according to the different lengths of the fan-out lines,
wherein the driving part comprises:
a driving film attached to the peripheral area of the display panel;
a driving integrated circuit which is disposed on the driving film and outputs the driving signals; and
film lines disposed on the driving film to connect the driving integrated circuit with the fan-out lines, respectively,
wherein at least two of the film lines have lengths different from each other, and
wherein at least two of the film lines have lengths the same as each other.

2. The display apparatus of claim 1, wherein a level of a driving signal of the driving signals is increased as a length of a fan-out line of the fan-out lines is increased.

3. The display apparatus of claim 1, wherein
the driving signals are data signals,
the driving part is a data driving part outputting the data signals to the data lines, and
the fan-out lines are data fan-out lines electrically connected to the data lines, respectively.

4. The display apparatus of claim 3, wherein a level of a data signal of the data signals outputted to a data fan-out line of the data fan-out lines is increased as a length of the data fan-out line is increased.

5. The display apparatus of claim 3, wherein
the driving film is a data driving film
the driving integrated circuit is a data driving integrated circuit, and
the driving film line is a data driving film line.

6. The display apparatus of claim 5, wherein a level of a data signal of the data signals outputted to a data film line of the data film lines and a data fan-out line of the data fan-out lines is increased as a length of the data film line and a length of the data fan-out line are increased.

7. The display apparatus of claim 1, wherein
the driving signals are gate signals,
the driving part is a gate driving part outputting the gate signals to the gate lines, respectively, and
the fan-out lines are gate fan-out lines electrically connected to the gate lines, respectively.

8. The display apparatus of claim 7, wherein a level of a gate signal of the gate signals outputted to a gate fan-out line of the gate fan-out lines is increased as a length of the gate fan-out line is increased.

9. The display apparatus of claim 7, wherein the gate driving part comprises:
the driving film is a gate driving film,
the driving integrated circuit is a gate driving integrated circuit, and
the driving film line is a gate driving film line.

10. The display apparatus of claim 9, wherein a level of a gate signal of the gate signals outputted to the gate film line of the gate film lines and a gate fan-out line of the gate fan-out lines is increased as a length of the gate film line and a length of the gate fan-out line are increased.

11. The display apparatus of claim 1, wherein the fan-out lines comprises a first fan-out line and a second fan-out line,
the film line comprises a first film line and a second film line,
the first fan-out line is electrically connected to the first film line, the second fan-out line is electrically connected to the second film line, and
resistance of the first fan-out line and first film line is substantially same as resistance of the second fan-out line and the second film line.

12. The display apparatus of claim 11, wherein the first fan-out line is longer than the second fan-out line, and the first film line is shorter than second film line.

* * * * *